US006865488B2

(12) United States Patent
Moerig et al.

(10) Patent No.: US 6,865,488 B2
(45) Date of Patent: Mar. 8, 2005

(54) METHOD OF USING CASCADED SWEEPS FOR SOURCE CODING AND HARMONIC CANCELLATION

(75) Inventors: Rainer Moerig, Houston, TX (US); Frederick J. Barr, Pearland, TX (US); David Lee Nyland, Palmer, AK (US); Gary Sitton, Houston, TX (US)

(73) Assignee: Westerngeco, L.L.C., Houston, TX (US)

( * ) Notice: Subject to any disclaimer, the term of this patent is extended or adjusted under 35 U.S.C. 154(b) by 0 days.

(21) Appl. No.: 10/758,778

(22) Filed: Jan. 16, 2004

(65) Prior Publication Data

US 2004/0148104 A1 Jul. 29, 2004

Related U.S. Application Data

(62) Division of application No. 09/981,224, filed on Oct. 17, 2001, now Pat. No. 6,687,619.
(60) Provisional application No. 60/241,211, filed on Oct. 17, 2000.

(51) Int. Cl.[7] ............................................. G01V 1/28
(52) U.S. Cl. ......................................................... 702/14
(58) Field of Search ............................ 702/14, 2, 18, 702/17; 367/75, 40, 48, 76, 56; 181/111; 73/649

(56) References Cited

U.S. PATENT DOCUMENTS

| | | | |
|---|---|---|---|
| 3,885,225 A | 5/1975 | Anstey et al. | 340/15.5 CP |
| 4,042,910 A | 8/1977 | Rietsch | 340/15.5 TA |
| 4,715,020 A | 12/1987 | Landrum, Jr. | 367/38 |
| 4,823,326 A | 4/1989 | Ward | 367/41 |
| 4,864,546 A | 9/1989 | Russell et al. | 367/41 |
| 4,982,374 A | 1/1991 | Edington et al. | 367/48 |
| 5,410,517 A * | 4/1995 | Andersen | 367/75 |
| 5,721,710 A | 2/1998 | Sallas et al. | 367/41 |
| 5,901,112 A | 5/1999 | Walker | 467/46 |

* cited by examiner

Primary Examiner—John Barlow
Assistant Examiner—Tung Lau
(74) Attorney, Agent, or Firm—Westerngeco, L.L.C.

(57) ABSTRACT

A method of seismic surveying using one or more vibrational seismic energy sources activated by sweep signals. The highest order harmonic that has sufficient strength to cause significant harmonic distortion of a sweep segment is determined. A number of sweep segments in excess of the number of sources is selected. Initial phase angles are selected for each sweep segment of each seismic energy source so that substantially all harmonics up to and including the highest order harmonic are suppressed. Using cascaded sweeps, seismic data are acquired and processed to substantially attenuate harmonics upto the selected order.

20 Claims, 12 Drawing Sheets

METHOD OF USING CASCADED SWEEPS FOR SOURCE CODING AND HARMONIC CANCELLATION

CROSS REFERENCES TO RELATED APPLICATIONS

This application is a divisional of U.S. patent application Ser. No. 09/981,224 filed on Oct. 17, 2000 now U.S. Pat. No. 6,687,619 with a priority claim from U.S. Provisional Patent Application No. 60/241,211 filed on Oct. 17, 2000.

FIELD OF THE INVENTION

This invention relates to the field of geophysical prospecting and, more particularly, to acquiring seismic vibrator data.

BACKGROUND OF THE INVENTION

The seismic exploration industry uses acoustic impulses to impart sonic vibrations into the earth to delineate subsurface structure for mineral exploration and development. These acoustic impulses may be from an explosive, implosive, swept-frequency (chirp) or random source. A recording of the acoustic reflection and refraction wavefronts that travel from the source to a receiver is used to produce a seismic field record. Variations in the travel times of reflection and refraction events in these field records indicate the position of reflection surfaces within the earth. The analysis and correlation of events in one or more field records in seismic data processing produces an acoustic image that demonstrates subsurface structure. The acoustic images are used to find valuable mineral deposits.

The swept-frequency or chirp type seismic source may utilize a relatively long pilot signal such as 2 to 15 seconds to assure sufficient energy is imparted to the earth. The swept-frequency or chirp type source method relies on signal compression to compress the signal and ensure sufficient vertical resolution to resolve the position of subsurface reflectors. Signal compression generally is called deconvolution, with many techniques well known in the art of seismic data processing. Deconvolution of sweep or chirp signals compresses the source signal into a much shorter signal representative of a subsurface reflective boundary. The accuracy and effectiveness of any deconvolution technique is directly related to how well the source signal is known or understood. Most deconvolution operators are derived from statistical estimates of the actual source waveform.

With a swept frequency type source the energy is emitted in the form of a sweep of regularly increasing (upsweep) or decreasing (downsweep) frequency in the seismic frequency range. The vibrations are controlled by a control signal, which can control the frequency and phase of the seismic signals.

When only one seismic source is used, the seismic surveys can be very time-consuming. With modern signal processing methods this period could be shortened if more than one seismic source could be used simultaneously. Multiple sources can be used if some means for distinguishing between signals emanating from the different sources can be provided. Further, the vibrational source generates harmonics which, in certain circumstances, can have an energy approaching or even exceeding the fundamental, and which can crossfeed with signals from other sources, giving misleading results when the signals are processed to separate the signals from each source. In addition, the harmonics are a source of noise and can mask weak reflection signals from deeper layers.

U.S. Pat. No. 3,885,225 to Anstey et al proposes a method to distinguish between multiple sources. Anstey et al is directed to a method and apparatus for broad-line seismic profiling, using several vibrators simultaneously emitting signals. The normal emission frequency bandwidth is divided into several parts that are allocated to individual vibrators in a sequence of separate emissions, in such a way that the several vibrators radiate mutually exclusive frequencies at any one time. The detected signals are separated on the basis of frequency to represent the individual signals from each vibrator. The frequency limitation on each individual vibrator reduces the sensitivity of the survey. Harmonic distortion in the vibrators or their coupling with the ground can inhibit signal separation from different generators, this '225 patent makes no attempt to remove or reduce this distortion.

Another method of signal separation from multiple vibratory sources using phase shifting of the signals on different sweeps is disclosed in U.S. Pat. No. 4,715,020 to Landrum. However, the problem of nonlinear distortion and crossfeed is not addressed in this patent.

A method for attenuating harmonic correlation noise caused by harmonic energy output from seismic vibrators was developed by Reitsch as disclosed in U.S. Pat. No. 4,042,910. The method includes the step of generating a plurality of sweep signals in series and with the phase of each succeeding sweep signal being shifted relative to the previous one by a predetermined phase angle that is a fraction of $2\pi$. The generated signals are separately recorded and transformed by inverse phase shifting before being added or stacked in a conventional manner. Using this method, a series of N sweep segments are output by the vibrators (one for each record) that differ only in phase. Correlation noise up the Nth harmonic is attenuated. This method provides a method of suppressing harmonics using phase shifting, but only for a single vibratory source, and crossfeed is not addressed.

U.S. Pat. No. 4,823,326 to Ward, claims a method for separating seismic records derived from multiple, concurrently operated vibrational seismic sources, with reduced harmonic distortion.

U.S. Pat. No. 4,982,374 to Edington and Khan is a method for reducing the distortion and crossfeed from any selected order harmonic for any number of vibratory seismic sources operated concurrently, at the same time providing for separation of the signals from the different sources and for improving the signal-to-noise ratio. After determining the highest order harmonic likely to cause distortion, a number of sweeps of each source in each position is selected. This number depends upon the number of sources and the highest order harmonic to be suppressed. Initial phase angles for each sweep of each source are then selected to permit signal separation while suppressing harmonics up to and including that highest order harmonic.

U.S. Pat. No. 5,410,517 to Andersen discloses a method of cascading sweep segments to suppress unwanted harmonic energy. The method uses sweep segments having varying phase angles such that harmonic energy in the correlated wavelets is attenuated. According to the method, a first cascaded sweep sequence is generated containing N sweep segments linked end-to-end. The N sweep segments are substantially identical, except that the initial phase angle of each sweep segment within the sweep sequence is progressively rotated by a constant phase increment of about 360/N degrees. A second cascaded sweep sequence is generated consisting of: (i) N consecutive sweep segments linked end-to-end which correspond to said first cascaded sweep sequence, and (ii) an additional sweep segment linked to the N consecutive sweep segments which is positioned and phased so as to substantially suppress harmonic ghosts during correlation. One of these cascaded sweep sequences is used for the vibrator sweep sequence and the other is used for the correlation reference sequence.

SUMMARY OF THE INVENTION

A method of seismic surveying using vibrational seismic energy sources activated by sweep signals which may be concatenated together. A number of seismic sources are selected, a highest order of harmonic energy able to cause significant distortion is selected, and a number of sweeps, or sweep segments to be combined together, is determined and selected to suppress unwanted harmonics and to separate source signals. The amplitudes of the correlation operators may be adjusted by measured ground force signal energy prior to correlation to balance and attenuate harmonic energy. The correlation operator may be the pilot sweep signal, the ground force signal or derived components of the pilot or ground force.

BRIEF DESCRIPTION OF THE DRAWINGS

The present invention and its advantages will be better understood by referring to the following detailed description and the attached drawings in which.

While the invention will be described in connection with its preferred embodiments, it will be understood that the invention is not limited thereto. On the contrary, it is intended to cover all alternatives, modifications, and equivalents that may be included within the spirit and scope of the invention, as defined by the appended claims.

DETAILED DESCRIPTION OF THE PREFERRED EMBODIMENTS

Figure 1:
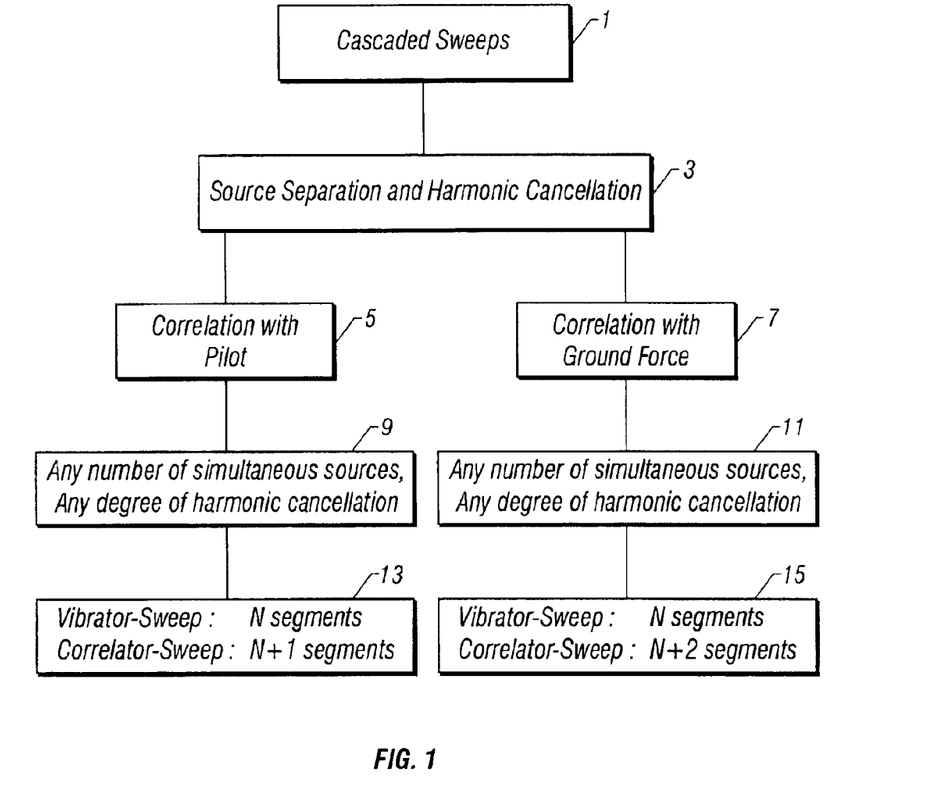
FIG. 1 illustrates the overall structure of the invention and its objectives.

The overall structure of the invention is best understood with reference to FIG. 1. This will aid in understanding the detailed description that follows. The method of the invention 1 as shown in FIG. 1, uses cascaded sweeps for acquiring seismic data. The purpose of the invention 3 is to be able to separate data from a plurality of sources as well as attenuate harmonics. In one embodiment of the invention, this is achieved by correlating a reflected seismic signal with a theoretical, predetermined signal related to the pilot sweep used to drive the vibrators 5. This may be done for any number of sources and any desired level of harmonic cancellation 9. Broadly speaking, when the correlation signal is related to the pilot sweep, each vibrator is swept with N sweep segments and the correlation signal comprises N+1 segments 13.

In an alternate embodiment of the invention, ground force signals are measured at the vibrators and the correlation signal is related to the ground force signals 7. As with the first method, any number of sources may be used and any degree of harmonic cancellation is possible 11. As with the first embodiment, vibrators are swept with N sweep segments; however, the correlation signal comprises N+2 segments of recorded ground force data. This is explained below.

The present invention is a seismic data acquisition method of using phase rotated sweeps and cascaded phase rotated sweep segments that may be used for multiple sources operated concurrently. The invention provides for suppression of harmonic ghosts and crossfeed energy while concurrently using multiple sources, leading to reductions in survey acquisition time and improved data quality. To the extent that the following description is specific to a particular embodiment or a particular use of the invention, this is intended to be illustrative and is not to be construed as limiting the scope of the invention.

Figure 2A:
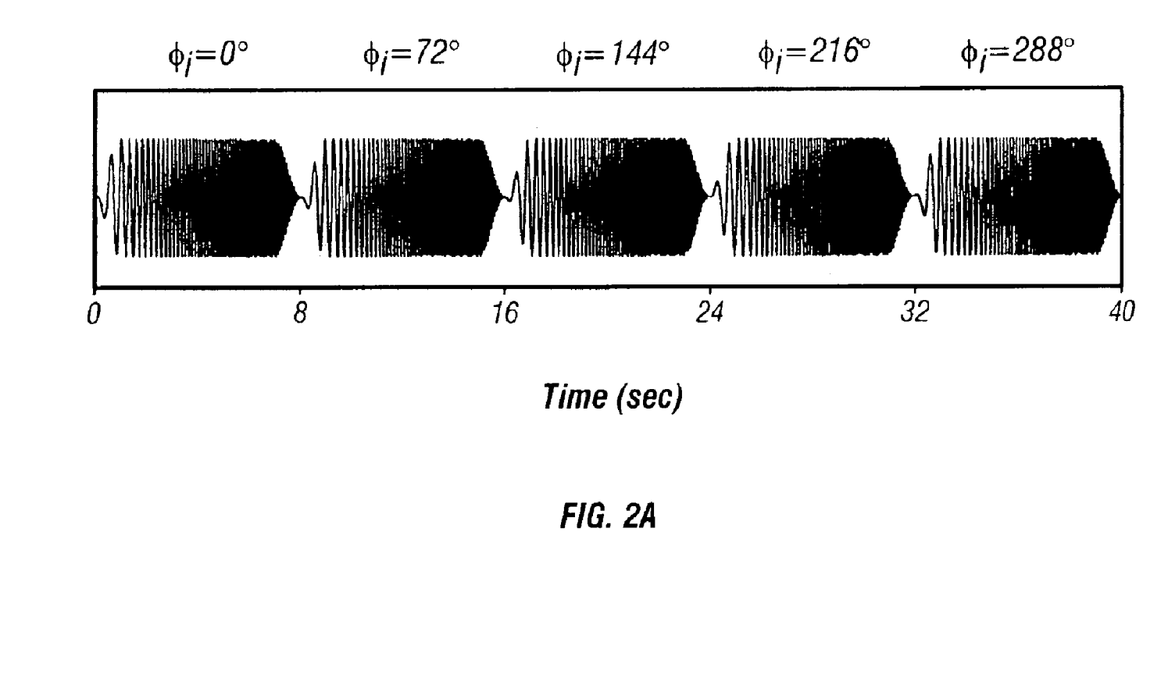
FIG. 2a illustrates a cascaded sweep with phase rotation.
Figure 2B:
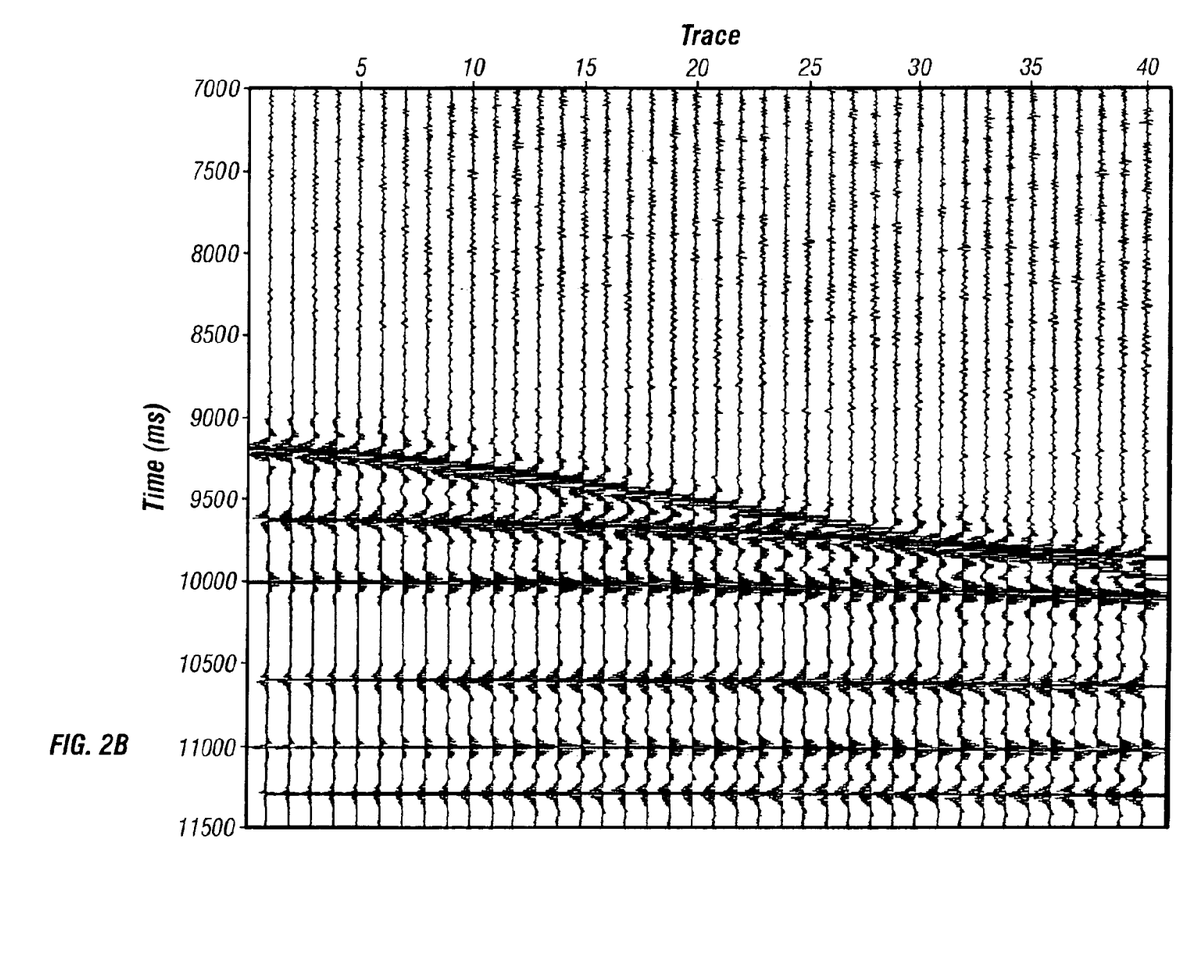
FIG. 2b illustrates a field record containing harmonic energy.

Vibrator crews may be more efficient when the field effort involves combining sweeps that would normally be output at a vibrator point (VP) into a cascaded sequence of sweep segments such as shown in FIG. 2a. This series of five cascaded sweep segments with the phase sequence 0, 72, 144, 216, and 288 degrees may be used to suppress upto the fifth harmonic (the $2^{nd}$, $3^{rd}$, $4^{th}$ and $5^{th}$) when one source is used. The field time required to record data for these five sweep segments is much shorter than that required to record them separately because only a single listen period is required. However, even if we build the cascaded sweep segments using a phase rotation method for canceling harmonics and crosscorrelate using the same cascaded sweep pilot signal, harmonic correlation noise results both before and after each wavelet in the correlated data. Correlation noise caused by cascaded sweep segments is evident in the correlated record of FIG. 2b.

In 1994, in U.S. Pat. No. 5,410,517 to Andersen, which patent is fully incorporated herein by reference, disclosed a method for attenuating the harmonic correlation noise caused by cascading the sweep segments of FIG. 2a. He found that forming a correlation pilot signal by adding another sweep segment to the sequence shown in FIG. 2a, (i.e. placing a replica of the last sweep segment in front of the first sweep segment of FIG. 2a), attenuated the harmonics. Andersen's method and claims specify that the phase rotation sequence of the individual sweep segments comprising the cascaded sweep must be progressive +−2π/N radians, where N is the number of sweep segments.

The present invention combines a method for source coding and harmonic cancellation when using multiple sources with a technique for cascading phase rotated vibrator sweep segments. In one embodiment of the invention, cascading is similar to U.S. Pat. No. 5,410,517 in that the reference pilot or correlation signal contains N or N+1 cascaded sweep segments. However, the method for determining the phase sequencing for the cascaded pilot sweep segments in the '517' patent is rigid in that phase rotations are progressive and determined solely by dividing 2π by the number of sweep segments. Following the scheme taught in the '517 patent does not allow the flexibility necessary to implement multiple sources operating coincident in time. The '517 patent method actually excludes the possibility of using multiple sources concurrently because the crossfeed harmonic cancellation requirement can not be achieved. Combining a method of cascading phase rotated sweep segments with a technique for source coding resulting in source signal separation allows for using multiple sources concurrently as well as suppression of harmonic ghosts and crossfeed energy.

In an embodiment of the present invention one or more sets of vibrators generate longer than normal output signals that consist of N cascaded, normal-length sweep segments. If more than one set of vibrators is used, they are located at different VP's. The recording is equal to N times the normal-length sweep time plus a single listen time (correlated record length). The recording time is therefore much shorter than recording a listen time for each of the N sweep segments. Each of the N cascaded sweep segments is phase rotated for source coding and suppression of harmonics. The field effort may be made more efficient with this method, as the total survey time is reduced.

Figure 3A:
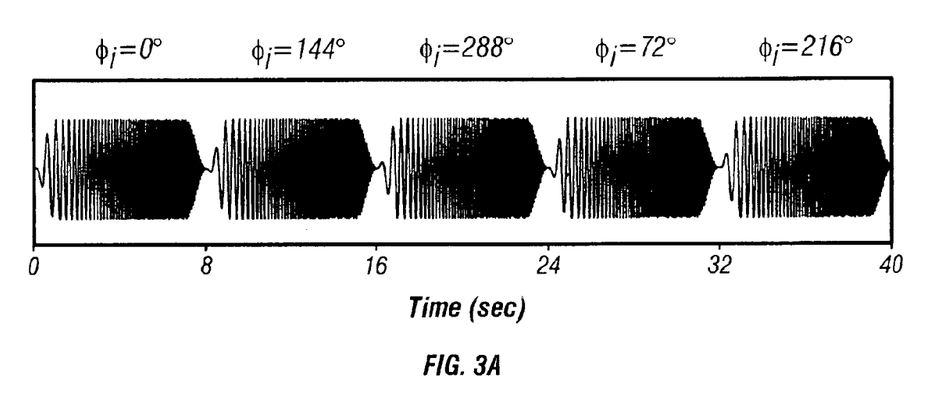
FIG. 3a illustrates a cascaded sweep sequence with phase rotation that may be used to suppress up to the fifth harmonic.

For example, using one vibrator source group and suppressing up to the $5^{th}$ harmonic may be accomplished with 5 sweep segments having phase rotations of 0, 144, 288, 72 and 216 degrees as shown in FIG. 3a. Suppressing up to the $7^{th}$ harmonic with 7 sweep segments may be accomplished with phase rotations of 0, 102.86, 205.71, 308.57, 51.43, 154.29 and 257.14 degrees. To suppress up to the $8^{th}$ harmonic with 8 sweep segments, a sequence of phase rotations for the sweep segments may be 0, 135, 270, 45, 180, 315, 90 and 225. For efficiency in the field effort, the vibrator sweep will contain N segments and the correlation operator will contain N+1 segments.

Figure 3B:
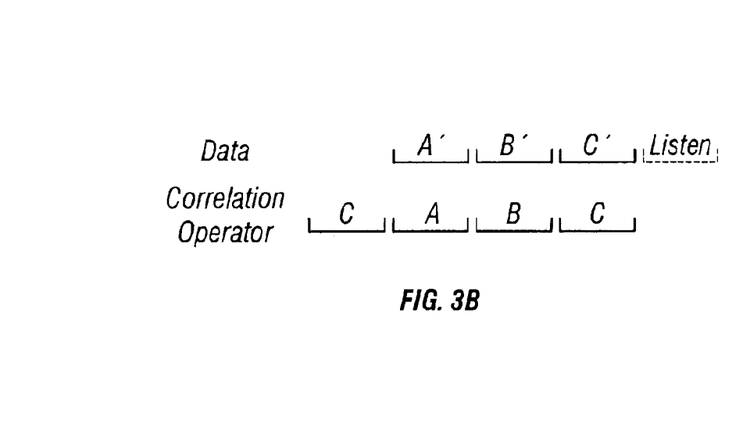
FIG. 3b shows is a schematic illustration of one embodiment of the invention in which the correlation signal comprises the sweep signal augmented by a sweep segment.
Figure 4:
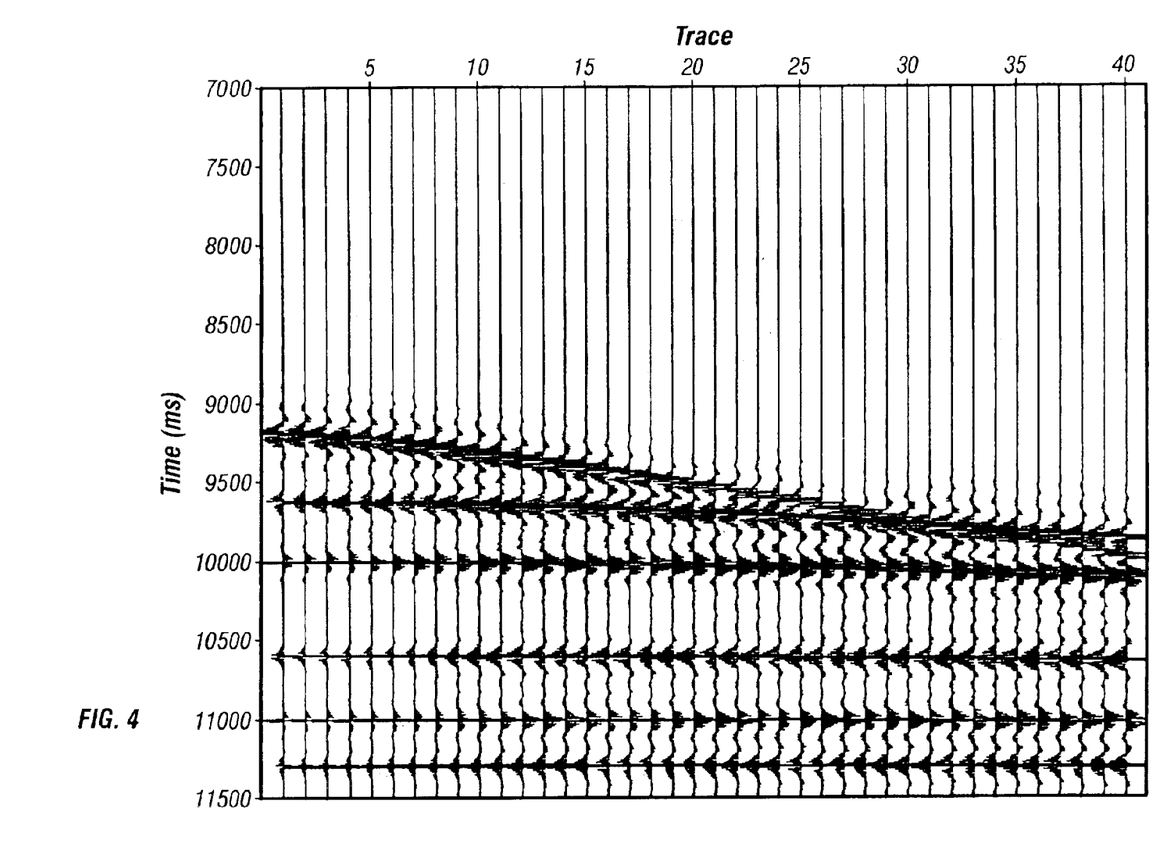
FIG. 4 illustrates a field record after application of the present invention.

FIG. 3a shows the cascaded sweep sequence for a preferred embodiment of the method of the present invention using one set of vibrators and for canceling harmonics up to the fifth harmonic. The sweep sequence is not progressive. The result of crosscorrelating data with the sweep segments shown in FIG. 3a (with an additional sweep appended) is shown in FIG. 4 where the harmonics have been eliminated. Comparing this result to the crosscorrelated data of FIG. 2b, which did not have the added sweep segment concatenated to the correlation operator, demonstrates harmonics have been eliminated. The method of this embodiment is illustrated in FIG. 3b for one vibrator. Data segments A', B', C' and LISTEN correspond to 3 sweep segments and a listen time following the end of the sweep. The correlation signal comprises sweep segments C, A, B, C.

Figure 3C:
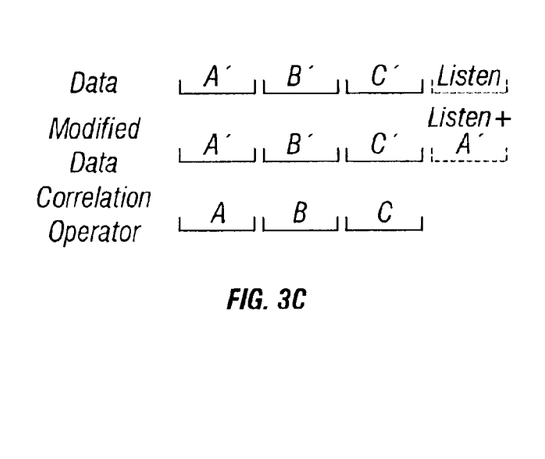
FIG. 3c shows is a schematic illustration of one embodiment of the invention in which the correlation signal comprises the unaugmented sweep signal.

In another preferred embodiment of the present invention, the data may be acquired using, for example the sweep sequence of FIG. 3a. During data processing the portion of the data recorded during the first sweep segment may be combined with the recording period 'listen time,' that is the period after the sweep sequences. Alternatively, this first sweep portion of the data recording may be combined with the 'listen time' portion of the field data recording during acquisition. It is straightforward to apply this to multiple sources operating concurrently. This method is illustrated in FIG. 3c where, as in FIG. 3b, there are three data segments A', B', C' followed by a listen time LISTEN. In the augmented data set, the data from the period A' is added to the data during the listen time and correlation is performed using the correlation operator A, B, C.

If multiple vibrator sources are to be used concurrently, there needs to be a way to separate the source signals. Edington and Khan developed a phase rotation scheme disclosed in U.S. Pat. No. 4,982,374 that did not envision cascaded sweep segments but provided simultaneous source coding and separation of multiple sources as well as cancellation of crosscorrelation harmonic noise. U.S. Pat. No. 4,982,374 is incorporated herein by reference.

In the present invention, recorded data are crosscorrelated with a cascaded-sweep pilot signal for each set of vibrators. The correlation operator reference signal or the vibrator sweep signal may contain N or N+1 cascaded sweep segments, but the phase sequencing of the sweep segments is chosen so that signals from concurrently operating sources may be separated. Whether the additional sweep segment is placed on the correlation operator or in the vibrator sweep sequence, the first and last sweep segment of the sweep segment series containing the additional segment will have identical initial and final sweep segments. Crosscorrelation then yields the compressed data result from each set of vibrators and so the source signals may be made separate datasets. The correlation noise caused by both the source harmonics and the cascaded sweep segments is greatly attenuated, making the use of cascaded sweep segments acceptable and applicable to concurrent data acquisition by more than one source.

Figure 5:
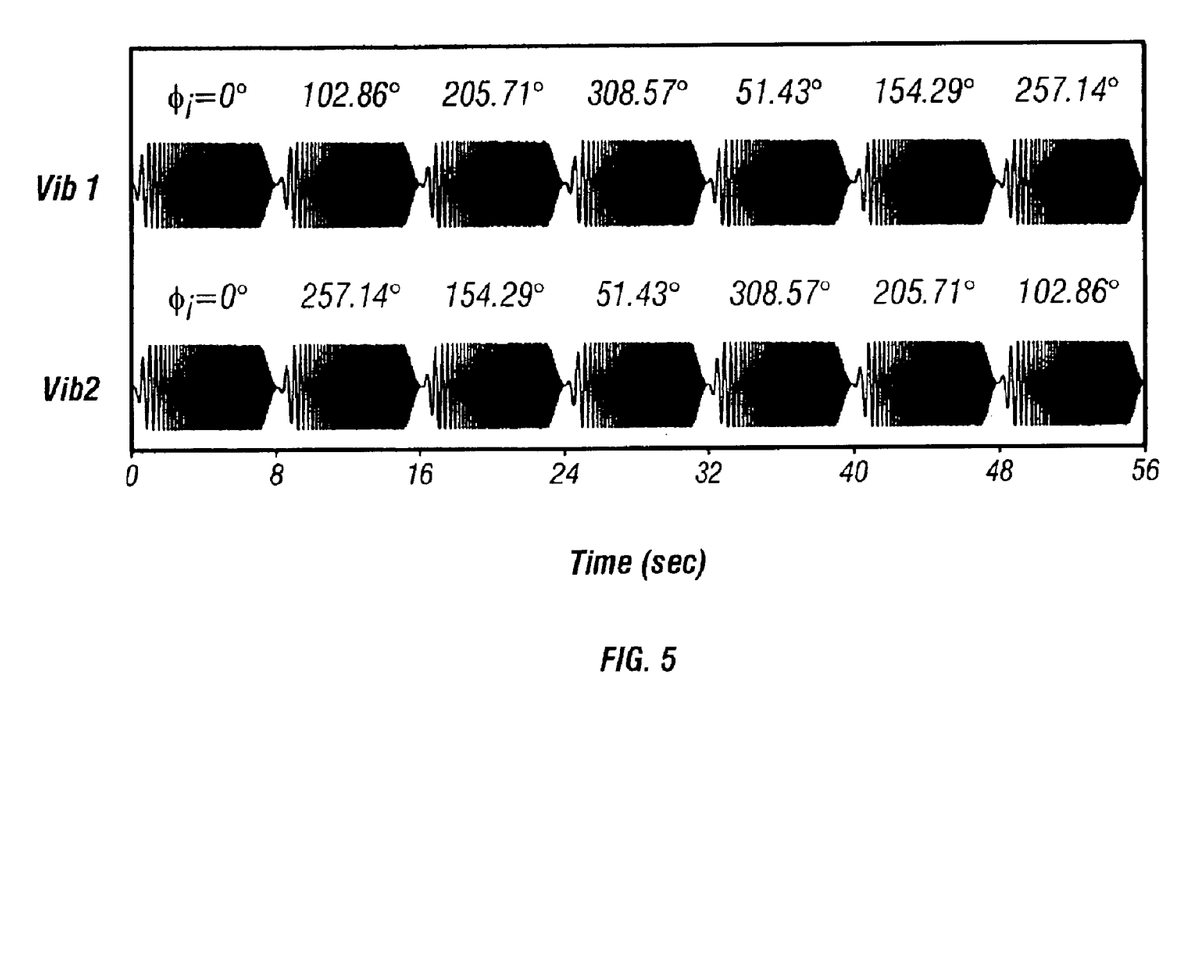
FIG. 5 illustrates two sweep sequences that may be used for two sources performing concurrent data acquisition.
Figure 6:
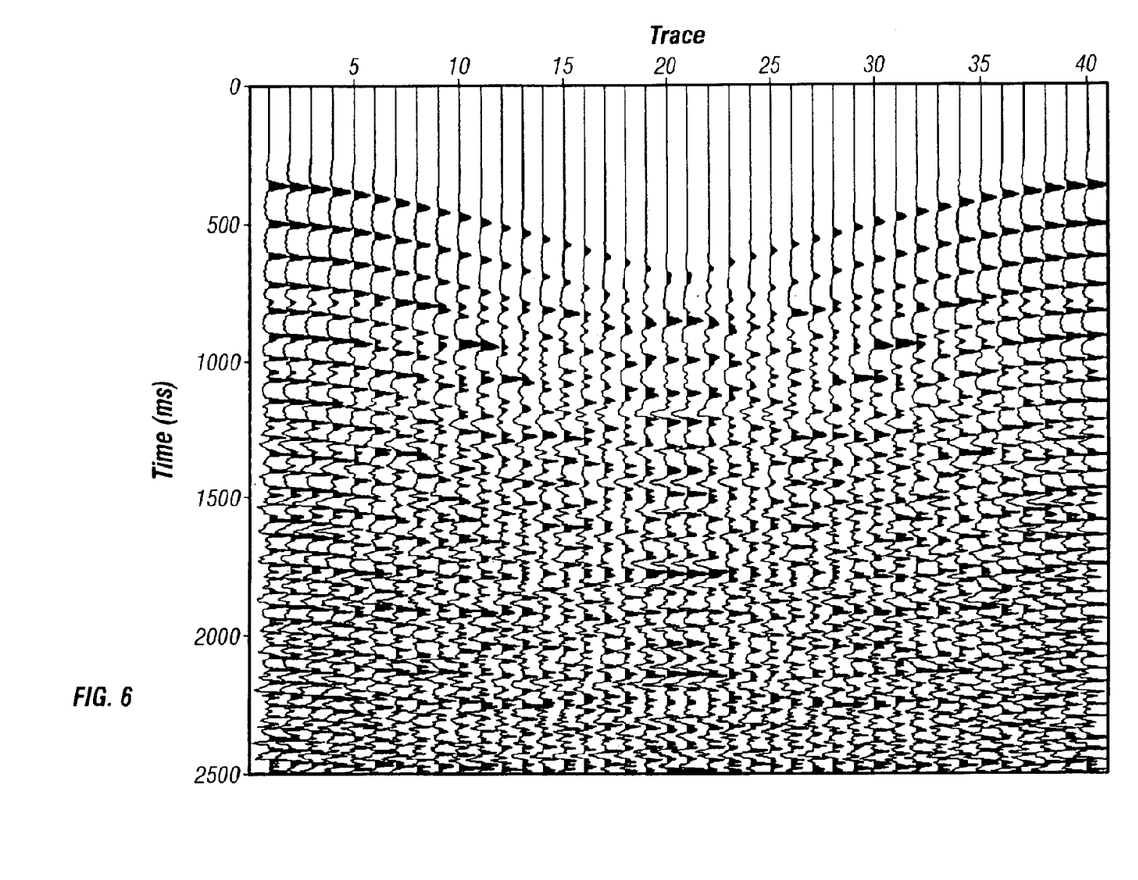
FIG. 6 illustrates a field record acquired with two sources before application of the present invention.
Figure 7A:
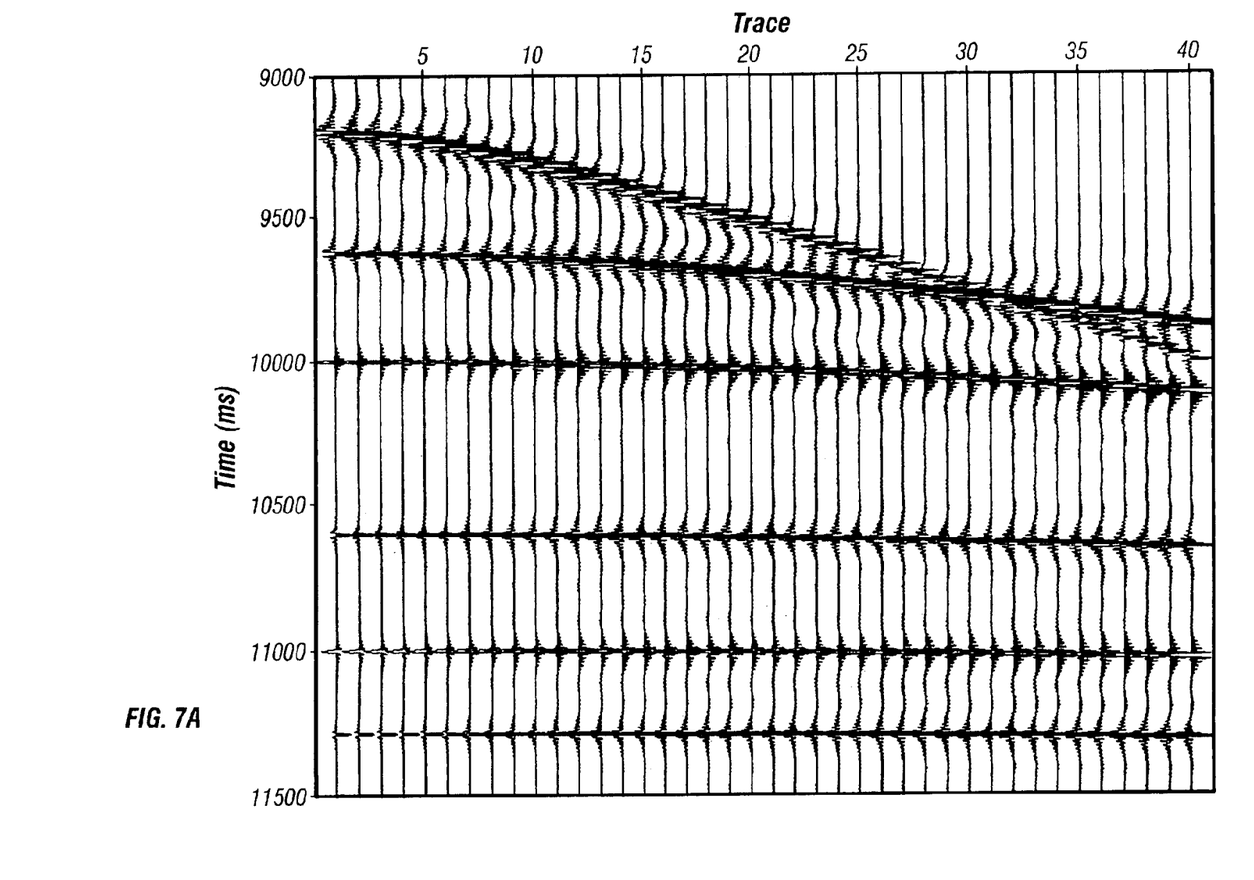
FIG. 7a illustrates an application of the present invention to separate the signal from one source of the concurrent acquisition demonstrated in FIG. 6.
Figure 7B:
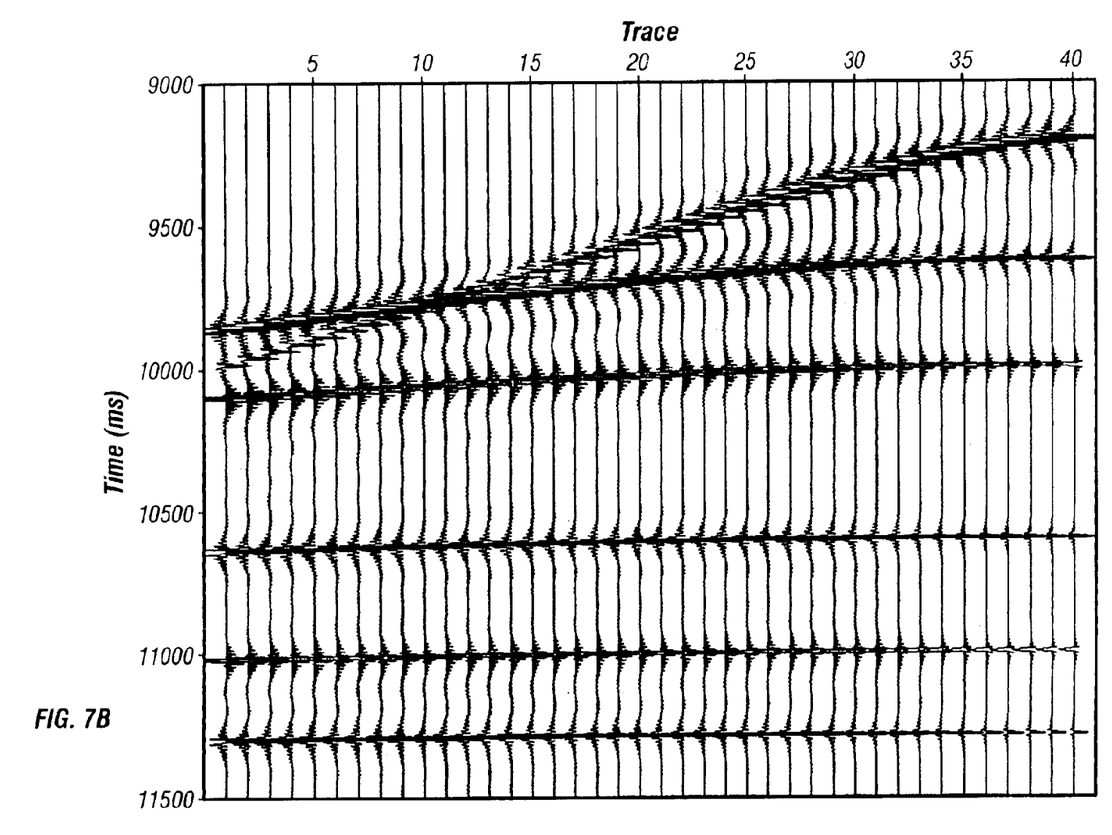
FIG. 7b illustrates an application of the present invention to separate the signal from the second source of the acquisition demonstrated in FIG. 6.

The Edington and Khan patent teaches a method to determine phase rotations for signal separation. FIG. 5 illustrates the cascaded sweep sequence for two sets of vibrators allowing for signal separation and for canceling up to the fifth harmonic (i.e., canceling the $2^{nd}$, $3^{rd}$, $4^{th}$ and $5^{th}$ harmonics). For this example, the phase sequence for the first vibrator or vibrator group, Vib 1, is 0, 102.86, 205.71, 308.57, 51.43, 154.29 and 257.14 degrees. Note, as stated previously in the single vibrator examples, that Vib 1 sequence alone will suppress up to the $7^{th}$ harmonic. The second concurrently sweeping vibrator or vibrator group, Vib 2, will have a sweep sequence phase rotation of 0, 257.14, 154.29, 51.43, 308.57, 205.71 and 102.86 degrees. Using the Vib 1 and Vib 2 cascaded sweep segments concurrently, only up to the $5^{th}$ harmonics are suppressed in contrast to the single vibrator example. FIG. 6 shows the first portion of an uncorrelated field record acquired with sweep series Vib 1 and Vib 2, indicating that the two sources are at opposite ends of the recording spread. FIGS. 7a and 7b display the separated record for each of the vibrator sources of FIG. 6 with harmonic noise cancelled.

The sweep segment series have been illustrated as sequentially adjacent, but also the invention may be practiced with the sweep series segments additively overlapped. For example, as one 10-second long sweep segment is within 2 seconds of finishing the next sweep segment may begin. For a sweep series containing 7 10-second sweeps, this would represent a significant time saving for the acquisition effort.

Each sweep segment comprising the cascaded sweep segment series is identical except for their respective phase rotations. However, they can be of any type, including linear or nonlinear up sweeps, down sweeps or even pseudo-random sweeps. Examples of pseudo-random sweeps are described in Goder, A., 1994, Minimum phase correlation of pseudo-random vibrator signals, 64th Ann. Internat. Mtg: Soc. of Expl. Geophys., 884–885 and Cunningham, A. B., 1979, Some alternate vibrator signals, *Geophysics*, v. 44, pp 1901–1921)

The phase rotation sequence allowing signal separation is equivalent to the phase rotation sequence with a constant added. In other words, the phase rotation sequence may be made more general by simply adding a constant to each phase term of the series. For example, if S1=0, 144, 288, 72 and 216, and S2=0, 216, 72, 288, and 144, then equivalent series having the same harmonic cancellation and signal separation are S3=10, 154, 298, 82 and 226, with S4=10, 226, 82, 298 and 154. It should be noted that when a single vibratory source is used, the first and last columns of the table defined in Edington should not be used.

The discussion above was related to embodiments of the invention wherein the correlation signal is related to the pilot sweep signal used for driving the vibrators. In another embodiment of the present invention the phase rotated sweep segment series is cross-correlated with the ground force (GF) signal rather than the pilot or the pilot with a repeated segment. The GF signal is a representation of the energy actually transmitted by the vibrator into the earth, and may be different than the pilot reference sweep. In general, the GF signal contains harmonics and subharmonics due to nonlinear coupling with the ground surface. Ground force signal may be measured by the method as disclosed in U.S. Pat. No. 6,161,076 to Barr et al., incorporated herein by reference, or any other method. GF signal measurement is a common practice, and there are several ways known in the art to acquire these measurements.

For example, the GF signals may be measured by one or more methods from different locations on and near the vibrator. The various measurements may be placed on auxiliary channels during acquisition of survey data. Saving the GF measurements to tape or memory allows for further processing, for instance, in the processing center. The GF signals may be conditioned by various methods known in the art, for example by substantially equalizing the measurements among vibrators or vibrator groups, or combining signals to create weighted sum representations of ground force. These GF signals or their further processed forms may then be used for correlation with the field records or to create other filters.

Figure 8:
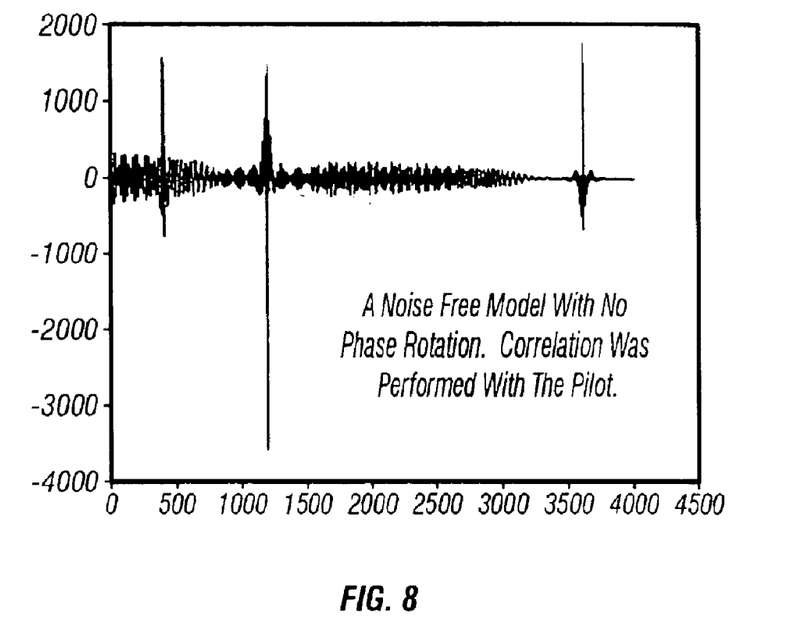
FIG. 8 illustrates a correlation of a vibrator signal with the pilot signal.
Figure 9:
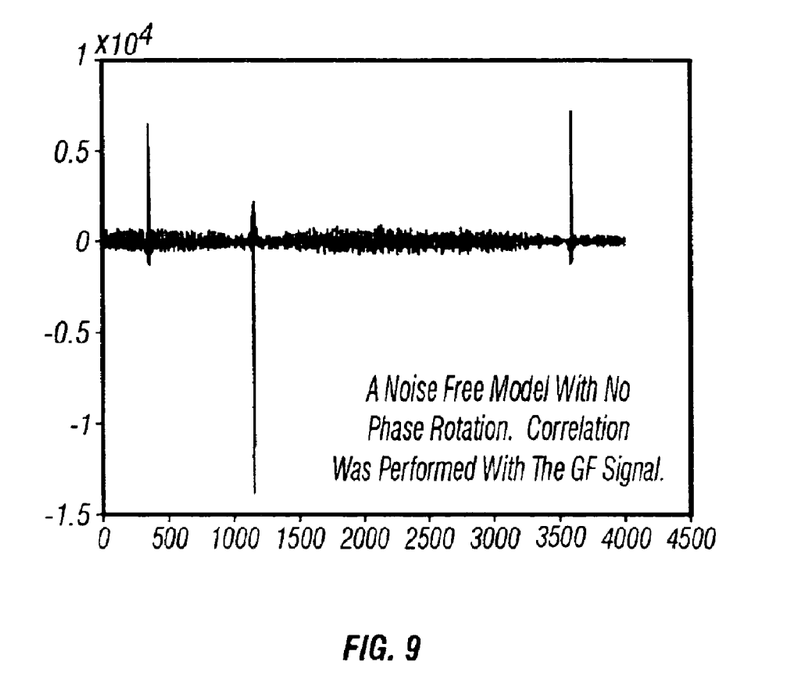
FIG. 9 illustrates a correlation of a vibrator signal with the ground force signal.

It has long been known that correlating a seismic record with the measured ground force signal produces undesirable cross-correlation terms between the fundamental and higher order harmonics. This effect may be seen in FIG. 8 where a pilot was used as the correlation operator, and in FIG. 9 where the correlation was performed with the GF signal. The harmonic energy from the harmonics' crosscorrelation terms spreads out away from the center of each wavelet and may mask weaker reflections.

The major problem with correlating with the pilot signal is that much of the energy output by the vibrator is not present in the resulting records. In other words, the harmonic energy output from the vibrator is not constructively utilized. This invention utilizes harmonic energy output from the vibrator.

Figure 10:
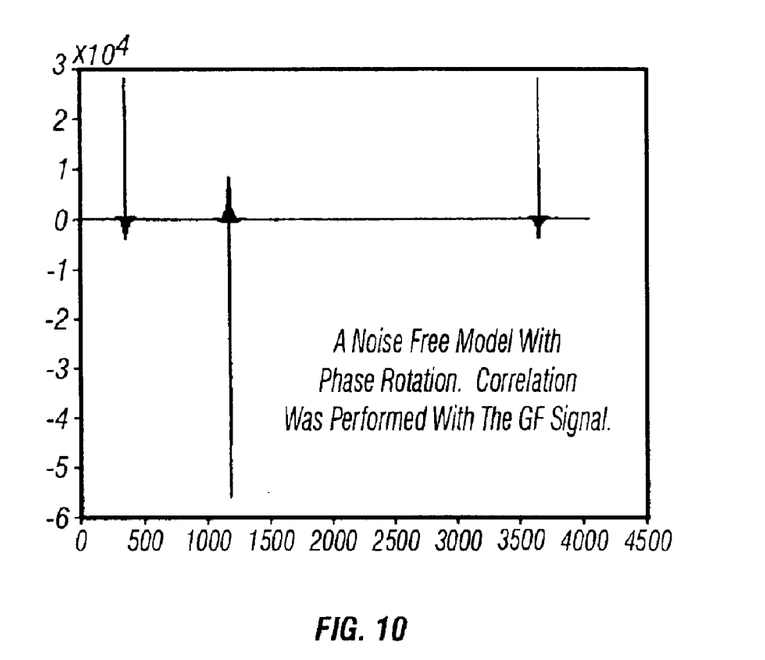
FIG. 10 illustrates a correlation with the ground force signal after sweep phase rotation for harmonic suppression.

FIG. 10 represents the result of using a GF signal, which contains higher order harmonic energy, as the correlation operator applied to a noise free model where the sweeps have been rotated to suppress unwanted harmonic energy. If the amplitudes of the harmonic energy are constant between individual sweeps, the harmonic energy will be eliminated; if the amplitudes are different, the harmonic energy will be attenuated.

Amplitude scaling of the correlation operator (whether the operator is a vibrator sweep pilot or a measured GF) may be used to compensate for differing, time-variant vibrator outputs during different sweeps. The vibrator output is measured using the ground force signal so that a scaling operator may be created. For example, a scaling operator may be created that balances amplitude variations occurring between the different sweeps for a vibrator source. Balancing or equalizing the amplitudes of the output sweeps will tend to equalize the harmonic energy; equalization of harmonic energy among differing sweeps enhances attenuation of unwanted harmonic energy.

Another amplitude scaling operator may be formed to enhance signal separation between sources rather than just source harmonic cancellation for a particular source sweep series. Effective and useful source signal separation is at least partly dependent on amplitude relationships of energy emanating from concurrently operating sources as well as their phases. A similar amplitude compensation operator to those for amplitude compensation between and among sweeps at a particular source may be formed that will ensure that desired cancellation (and hence signal separation) properly occurs between concurrently operating sources.

Figure 11:
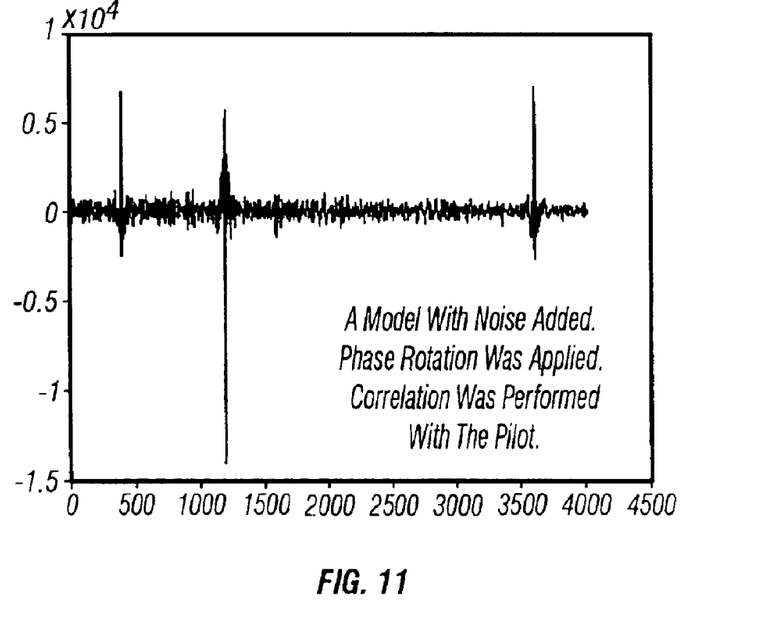
FIG. 11 illustrates a correlation with the pilot sweep on phase-rotated sweep segments with noise added.
Figure 12:
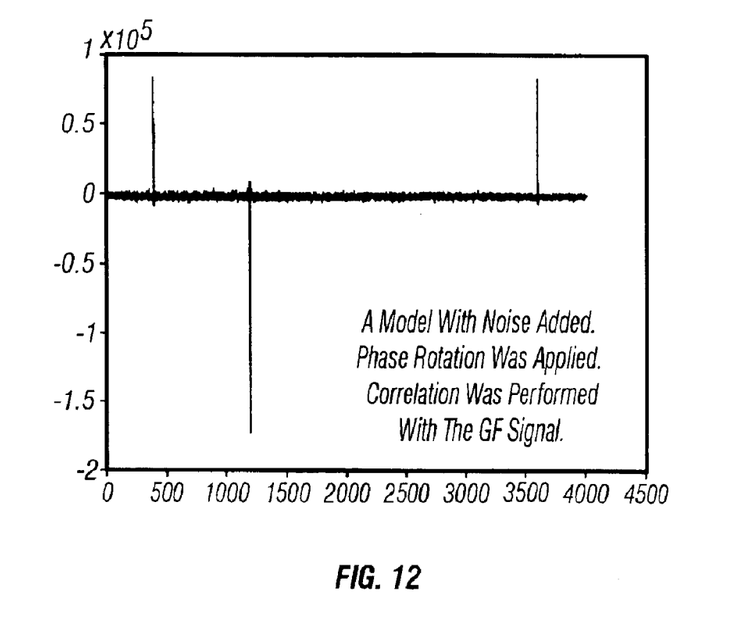
FIG. 12 illustrates a correlation with the ground force signal on phase-rotated sweep segments with noise added.

Using the GF signal with properly rotated sweeps produces results superior to using the pilot sweep correlation operator. The signal to noise ratio is lower when the pilot is used as can be seen in FIG. 11 when compared to FIG. 12, the result of phase rotated sweeps correlated with the GF signal.

Figure 13:
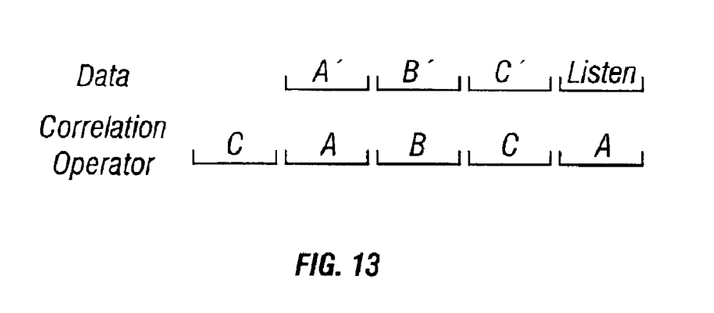
FIG. 13 is a schematic illustration of the correlation process when ground force signals are used.

Using the GF signal as the correlation operator can also be applied to the method of phase rotating cascaded sweep segments similar to the technique outlined above. The usual case, however, will call for appending two sweep segments on to the correlation operator, one on the beginning of the operator, the other on the opposite end. A cascaded sweep made up of N segments would become a cascaded GF correlation operator with N+2 segments. For example, for the vibrator sweep segment series containing phases 0, 144, 288, 72 and 216, the correlation operator would be formed from the measured GF signal. The initial and final segments of the vibrator sweep GF signal would be copied and appended to opposite ends. This measured GF signal recorded from the output of the example five segment vibrator sweep would become the basis for a seven sweep segment GF correlation operator consisting of the following phase series: 216, 0, 144, 288, 72, 216 and 0. The correlation process is illustrated in FIG. 13 for three data segments A', B', C', (LISTEN) wherein the correlation signal comprises C, A, B, C, A.

It should be understood that the invention is not to be unduly limited to the foregoing which has been set forth for illustrative purposes. Various modifications and alternatives will be apparent to those skilled in the art without departing from the true scope of the invention, as defined in the following claims

What is claimed is:

1. A method for recording and processing vibratory source seismic data, the method comprising:
(a) generating a cascaded sweep sequence comprising N sweep segments that are either concatenated or overlapping sequentially, where N is equal to or greater than 2, said N sweep segments being substantially identical, except that the initial phase angles of said N sweep segments are progressively rotated by a constant phase increment of about 2 m $\pi$/N radians where m is an integer and $|m|>1$;
(b) using said cascaded sweep sequence to drive at least one vibratory source thereby propagating a seismic wave into the earth at a selected location;
(c) recording a groundforce signal associated with said seismic wave;
(d) recording at least one reflection signal from a location within the earth responsive to said seismic wave; and
(e) using said recorded groundforce signal for processing the signal recorded to produce a processed signal.

2. The method of claim 1 wherein processing the signal recorded comprises cross-correlating the recorded signal with a signal comprising said ground force signal and a first and a last sweep segment of said ground force signal.

3. The method of claim 1, wherein said sweep segments further comprise a sinusoidal wavetrain having a frequency that either increases monotonically with time or decreases monotonically with time.

4. The method of claim 3 wherein said increase or decrease of said frequency is linear with time.

5. The method of claim 1, wherein said sweep segments further comprise a psuedo-random sweep series.

6. The method of claim 1 wherein said at least one vibratory source comprises a plurality of vibratory sources, the method further comprising:
i) selecting a number, n, of said vibratory sources activated by n said cascaded sweep sequence signals;
ii) selecting a number of a highest order harmonic that has sufficient strength to cause significant harmonic distortion of a sweep segment that is part of a sweep sequence;
iii) defining a reference signal associated with each of said sources, each reference signal comprising a number N of sweep segments, N being greater than n, said sweep segments being either concatenated or overlapping; and
iv) selecting initial phase angles for each sweep segment of each reference signal so that substantially all harmonics up to and including said highest order harmonic are suppressed and driving each vibratory source with its sweep sequence and driving each of said sources with its associated reference signal.

7. The method of claim 6 wherein selecting said initial phase angles for generating a sweep sequence associated with each energy source further comprises:
(A) constructing a table with N rows and N columns, where N is the number of sweep segments, each entry $e_{hj}$ being calculated from the formula $e_{hj}$=hj modulo N, where h is the row number and j is the column number;
(B) selecting a number of columns equal to the number of sources such that the number in the first row of each selected column does not appear again in any selected column before the row H=F+1, where F is the highest order harmonic determined to cause significant cross-feed; and
(C) assigning a selected column to each seismic energy source, the initial phase angle for the h-th sweep of that seismic energy source being represented by the number in the h-th row of that column multiplied by $2\pi/N$.

8. A method for recording and processing vibratory source seismic data, the method comprising:
(a) simultaneously transmitting, with n vibratory sources where $n \geq 1$, associated ground force signals into the earth, each said ground force signal including a fundamental signal and harmonics thereof, said fundamental signal having an initial phase;
(b) recording said n ground force signals;
(c) recording at least one reflection signal from a location within the earth responsive to n ground force signals to give a first recorded signal;
(d) repeating steps (a)–(c) m−1 times wherein said initial phases are shifted by $2\pi/m$ radians to give a total of m recorded signals and n×m ground force signals; and
(e) using the n×m ground force signals for processing the m recorded signals to give processed signals associated with said n vibratory sources.

9. The method of claim 8 wherein processing the m recorded signals further comprises:
i) correlating the first recorded signal with each associated ground force signal to give n intermediate signals;
ii) repeating step (i) m−1 times to give a total of n×m intermediate processed signals; and
iii) summing the m intermediate processed signals associated with each vibratory source to give a processed signal associated with each vibratory source.

10. The method of claim 8, wherein said sweep segments further comprise a pseudo-random sweep series.

11. The method of claim 9, wherein said sweep segments further comprise a sinusoidal wave train having a frequency that either increases monotonically with time or decreases monotonically with time.

12. The method of claim 10, wherein said pseudo-random sweep series are phase-rotated by selected increments.

13. The method of claim 11 wherein said increase or decrease of said frequency is linear with time.

14. A method for recording and processing vibratory source seismic data, the method comprising:
(a) selecting a number of seismic energy sources to be used for surveying;
(b) selecting a number of a highest order harmonic that has sufficient strength to cause significant harmonic distortion of a sweep segment that is part of a sweep sequence;
(c) defining a reference signal associated with each of said sources, each reference signal comprising a number N of sweep segments, N being greater than the number of seismic sources, said sweep segments being either concatenated or overlapping;
(d) selecting initial phase angles for each sweep segment of each reference signal so that substantially all harmonics up to and including said highest order harmonic are suppressed and driving each vibratory source with its sweep sequence and driving each of said sources with its associated reference signal, thereby generating seismic waves propagating into the earth;
(e) recording ground force signals associated with each reference signal;
(f) recording at least one reflection signal from a location within the earth responsive to said seismic waves; and
(g) using said ground force signals for processing said at least one recorded reflection signal.

15. The method of claim 14 wherein processing said at least one recorded signal comprises correlating the at least one recorded signal with a plurality of processing signals, each said processing signal comprising said reference signal combined with at least one additional segment of said reference signal.

16. The method of claim 14 wherein selecting initial phase angles further comprises:
   i) constructing a table with N rows and N columns, each entry $e_{hm}$ being calculated from the formula $e_{hm}$–hm modulo (N) where h is the row number and m is the column number;
   ii) selecting a number of columns equal to the number of sources such that none of the numbers of each selected column appears again in any other selected column before the row H=F+1; and
   iii) assigning a selected column to each seismic energy source, the initial phase angle for the h-th sweep segment of that seismic energy source being represented by the number in the h-th row of that column multiplied by $2\pi/N$.

17. The method of claim 14, wherein said sweep segments further comprise a sinusoidal wavetrain having a frequency that either increases monotonically with time or decreases monotonically with time.

18. The method of claim 17 wherein said increase or decrease of said frequency is linear with time.

19. The method of claim 14, wherein said sweep segments further comprise a pseudo-random sweep series.

20. The method of claim 19, wherein said pseudo-random sweep series are phase-rotated by selected increments.

* * * * *